United States Patent [19]

Lofstedt

[11] Patent Number: 4,472,344
[45] Date of Patent: Sep. 18, 1984

[54] SIMPLIFIED SEGMENTED MAGNETIC COIL ASSEMBLY FOR GENERATING A TOROIDAL MAGNETIC FIELD AND THE METHOD OF MAKING SAME

[75] Inventor: Hakan N. Lofstedt, San Diego, Calif.

[73] Assignee: FDX Patents Holding Company, N.V., La Jolla, Calif.

[21] Appl. No.: 336,063

[22] Filed: Dec. 31, 1981

[51] Int. Cl.³ .................... H01F 7/22; G21B 1/00
[52] U.S. Cl. .................... 376/142; 376/133; 335/216
[58] Field of Search .................. 376/133, 142; 336/DIG. 1, 228, 234; 335/216

[56] References Cited

U.S. PATENT DOCUMENTS

| | | | |
|---|---|---|---|
| 4,116,264 | 9/1978 | Farfaletti-Casali et al. | 376/142 |
| 4,263,096 | 4/1981 | Ohkawa et al. | 376/142 |
| 4,268,353 | 5/1981 | Powell et al. | 376/142 |
| 4,277,768 | 7/1981 | Burgeson et al. | 376/142 |

FOREIGN PATENT DOCUMENTS

| | | | |
|---|---|---|---|
| 52-72090 | 6/1977 | Japan | 376/142 |
| 53-32296 | 3/1978 | Japan | 376/142 |
| 53-72995 | 6/1978 | Japan | 376/142 |

OTHER PUBLICATIONS

Proc. of 6th Symp. on Eng. Pbs. of Fusion Res. IEEE Pub. No. 75CH1097-5-NPS (11/75), pp. 496–498 Bushwell.
"The Deals Magnet Concept and its Applications to High Density, High Field Tokamak Systems" by S. Y. Hsieh et al.

Primary Examiner—Sal Cangialosi
Attorney, Agent, or Firm—Schwartz, Jeffery, Schwaab, Mack, Blumenthal & Koch

[57] ABSTRACT

Disclosed is a segmented toroidal field coil for use in a tokamak-type reactor and a method for forming the coil. Each toroidal field coil winding is segmented into two or more segments with a connection means provided at the end of each segment for electrically connecting the segments together and for joining consecutive adjacent segments. The coil segments are electrically conducting and will, therefore, induce a toroidal magnetic field when its feed points are connected to a power source. The toroidal field coil of the present invention maximizes heat flow from the plasma region of the reactor to the external blanket by eliminating bulky crossover connections from coil to coil that could otherwise restrict the heat flow. The present invention discloses a simple and efficient method for forming a toroidal field coil assembly that eliminates costly final machining such as precision twisting.

16 Claims, 7 Drawing Figures

SIMPLIFIED SEGMENTED MAGNETIC COIL ASSEMBLY FOR GENERATING A TOROIDAL MAGNETIC FIELD AND THE METHOD OF MAKING SAME

FIELD OF THE INVENTION

The present invention relates generally to segmented magnetic coil windings and more particularly to segmented magnetic coil windings for use in tokamak or other magnetic confinement fusion reactors. The present invention also relates generally to toroidal reactors for producing fusion reactions and more particularly to toroidal field coil windings for toroidal reactors where the coil windings are composed of two or more segments of similar or dissimilar materials. The invention also relates to a method of forming a simplified segmented magnetic coil assembly for generating a toroidal magnetic field.

BACKGROUND OF THE INVENTION

Prior art tokamak fusion reactor (TFR) concepts were directed to large machines with blanket and shield elements positioned in between the plasma fusion region of the TFR and the large superconducting toroidal field (TF) coils. In U.S. Pat. No. 4,367,193 and U.S. Pat. No. 4,363,775, there is disclosed a small machine with the blanket means positioned external to the normally conducting TF coil assembly. It is known in the art that such blankets can advantageously use the neutrons generated in the fusion plasma to breed new fuel to produce thermal energy, and to create additional energetic reactions. This invention is directed to those TFRs utilizing external blankets (XBTFR) such as those disclosed in the commonly assigned U.S. Patent applications referred to above.

In the case where a TFR uses the deuterium tritium (d,t) reaction, approximately 80% of the energy output is in the form of the kinetic energy of fast neutrons. In the small machine referred to in the above-mentioned U.S. patents, the TF coil is exposed to the neutron flux. The neutron radiation heat loads precludes the use of superconducting materials for the TF coils in this small machine design.

Inasmuch in the small TFR design, the TF coil surrounds the plasma region, the neutrons created as a result of the fusion reactions must pass through it. In this regard, many prior art TF coil assembly designs will absorb a considerable fraction of the neutrons created by the fusion reactors and that those do emerge without being absorbed in the TF coils will have lost much of their kinetic energy in the TF coils.

While it is a feature of the TFR design disclosed in U.S. Pat. No. 4,367,193 and U.S. Pat. No. 4,363,775 to remove the energy deposited in the TF coils and recover it as useful heat, energetic neutrons are far too valuable for breeding fuel for fusion and fission reactors and for generating high temperature heat in the blanket to be used merely as a source of heat in the TF coils.

In addition, there is a need for access to the fusion region of a XBTFR in order to attach vacuum purge lines, cooling inlet and outlet lines, fuel feed lines, electrical power connections and diagnostic equipment.

Applicants have found that one of the consequences of the TFR geometry is that the current density and mechanical stresses imposed on the TF coils are much greater in the region of the inner part of the TF coil, the region nearest the center or the main axis of the machine. Another consequence of the XBTFR geometry is that most of the neutrons generated in the fusion plasma exit through the outer part of the TF coil or the region farthest from the center or main axis of the TFR.

Co-pending and commonly assigned Ser. No. 340,237, filed Jan. 15, 1982 entitled "Composite Coils for Tokomak Reactors and the Method of Using Same" address these problems by the use of a coil where inner section is composed of copper or copper alloy which has both a high electrical conductivity and a high tensile strength to withstand the forces accompanying the strong magnetic fields and an outer section whose outer section is composed of Al or Al alloy which also has a high electrical conductivity but which has a low co-efficient neutron absorbtion.

While the present invention can make use of the teachings of Ser. No. 340,237 in the design of the TF coils, the present invention is directed to a structure for achieving the segmenting of the TF coils.

SUMMARY OF THE INVENTION

Accordingly, it is an object of the present invention to provide an improved magnetic coil structure.

It is also an object of this invention to provide a magnetic coil structure that has high electrical conductivity and high strength.

It is a further object of this invention to provide an improved TF coil winding for TFRs.

It is also an object of this invention to provide improved TF coil windings for XBTFRs that have high strength and high electrical conductivity.

It is a still further object of this invention to provide improved TF coil design for XBTFRs that have high strength and high electrical conductivity and which absorb relatively few energetic neutrons passing through the TF coils.

It is a still further object of this invention to provide improved TF coil design for XBTFRs that utilize materials wherever possible that provide improved neutron economy, reduced TF coil nuclear heating and heating gradients, and reduced activation.

It is a still further object of the instant invention to provide an improved TF coil design for XBTFRs that shifts the nuclear heating load from the magnets, coils and supporting structures to the surrounding media (e.g., blankets).

It is a further object of the present invention to provide an improved TF coil design for XBTFRs that will provide maximum access to the fusion region.

It is a further object of the present invention to provide an improved TF coil design to maximize the heat flow from the plasma to the blanket in a XBTFR.

It is also an object of the present invention to provide a TF coil design made of segments with a simplified structure for joining any electrical crossovers.

It is a further object of the present invention to provide a simplified TF coil which eliminates the need for costly final machining.

To achieve the foregoing and other objects in accordance with the principles of the present invention, there is provided a coil structure comprising at least two conductor segments, the segments may all be made of the same material or of different materials to take advantage of the low neutron absorption of certain materials. Preferably the conductor segments are joined at a high strength, high electrical conductivity joint. It is also preferred that the joint be constructed so as not to interfere with heat removal from the coils and be simple of both design and construction.

In a further aspect of the present invention, there is provided a coil structure for a TFR wherein the coil structure consists of several segments of the same or different materials wherein the segments are joined at a high conductivity, high strength joint that is simplified in design and easy to construct. Preferably the joint is constructed so as not to interfere with heat removal from the coil and the coils designed to allow maximum access to fusion regions.

In a further aspect of the present invention, a TFR is provided for producing fusion reactions in a region generally adjacent to the TF coils which are exposed to the neutron flux. The TF coils, in accordance with the principles of the present invention, consist of at least two segments joined together at high conductivity, high strength joints. Preferably, the side of the TF coil nearest the center of the TFR is made of copper or copper alloy. This has been found to be the portion of the TF coil where the current density and the mechanical stresses imposed are the greatest. It is also preferred that the opposite side of the coils be made of aluminum or aluminum alloy. This has been found to the the region of the TF coils where the much larger fraction of the neutrons produced pass through the TF coils to the outside or blanket region. It is also preferred that the joint be constructed to provide a generally smooth and continuous surface with the coil segments and be constructed so as not to interfere with heat removal from the TF coils. Preferably, the TF coil structure is simple of design and allows for easy use of tritium purge lines, fuel feed lines, coolant line and diagnostic equipment while at the same time occupying as little space as possible consistant with strength and current carrying capacity considerations.

The present invention provides a TF coil of a simplified design to contain a high temperature plasma in a TFR. The TF coil assembly consists of a series of spiralling, electromagnetic coils, generally turned into circles which are divided into two or more segments, each with an electrical feedpoint at each end. The material in the coil is electrically conducting and when its feedpoints are properly connected together and then to a power source, the coil windings will induce a magnetic field towards center the high temperature plasma contained within the TF coil assembly to prevent its being cooled off or disrupted by touching any surface. The present invention maximizes the heat flow from the plasma to the blanket by eliminating bulky electrical crossover connections that would otherwise restrict the heat flow and by allowing for the use of materials with a low cross-section of neutron absorption.

The present invention provides a simplified TF coil assembly with a restricted number of coil components and further eliminates certain costly final machining procedures, such as precision twisting, by utilizing flat surfaces at the segment endpoints.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings illustrate the present invention and together with the description and the rest of the specification, serve to explain the principles of the invention. In the drawings.

DETAILED DESCRIPTION OF THE INVENTION

Figure 1:
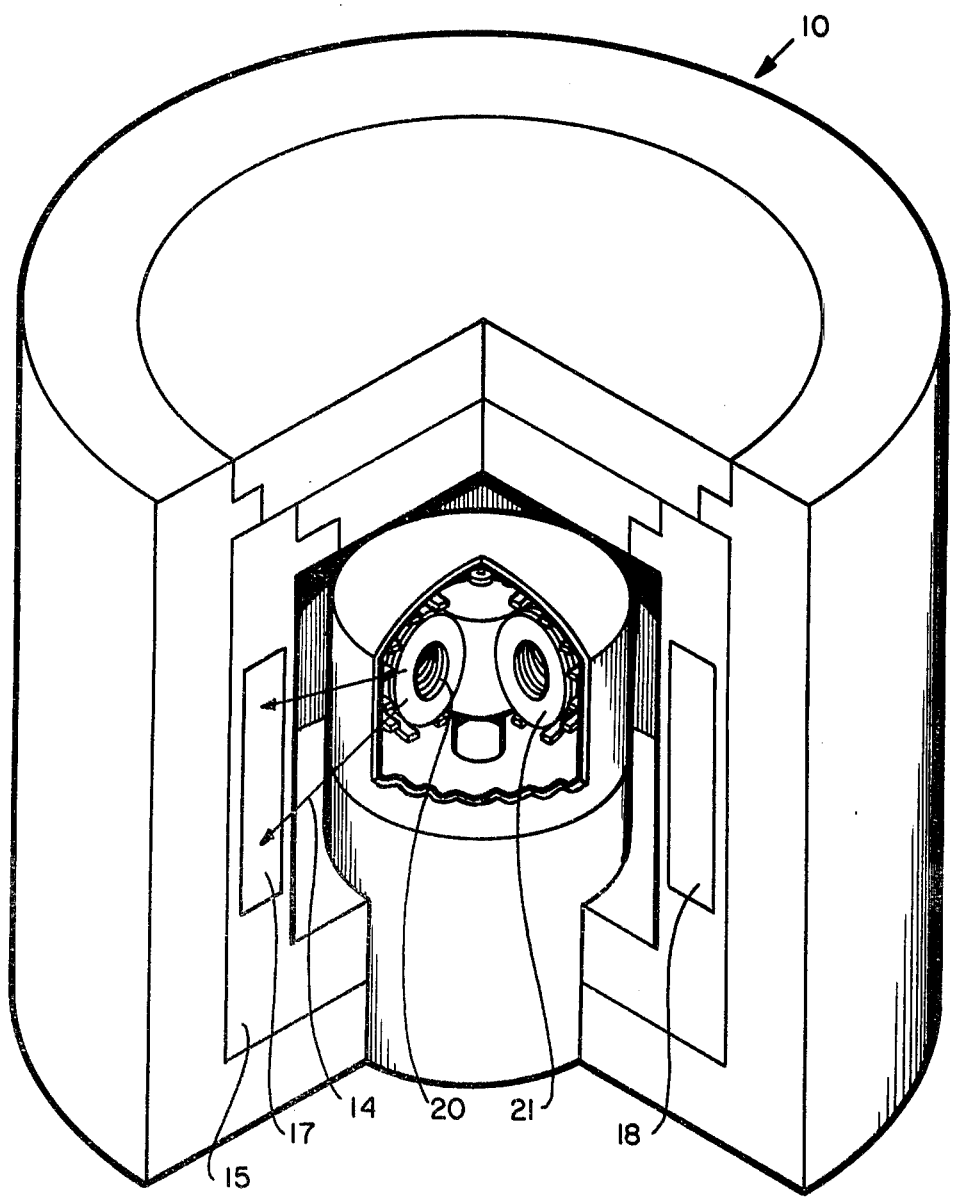
FIG. 1 is a perspective cutaway view of a XBTFR.

FIG. 1 generally depicts a XBTFR 10 in accordance with the present invention. The blanket region 15 generally forms no part of the present invention but it does contain a fissile-fertile region 18 in which neutrons generated in the plasma 20 are utilized. Region 17 is a tritium breeding region which also makes benificial use of energetic neutrons emitted from the plasma region 20. As will be understood by one of skill in the art, the blanket region 15 also constitutes the main heat absorber of TFR whereby the heat produced by the TFR can advantageously be recovered (by a cooling system and heat exchanger not shown and which form no part of the present invention).

In order to confine the plasma 20, toroidal field (TF) coils 21 are mainly used. These TF coils 21 are positioned between the plasma region 20 and the blanket region 15. Therefore, to make maximum use of the neutron and heat (generally depicted by arrows 14) generated within the plasma region 20, the TF coil assembly 21 should allow as many neutrons and as much heat as possible to pass through it.

Figure 2:
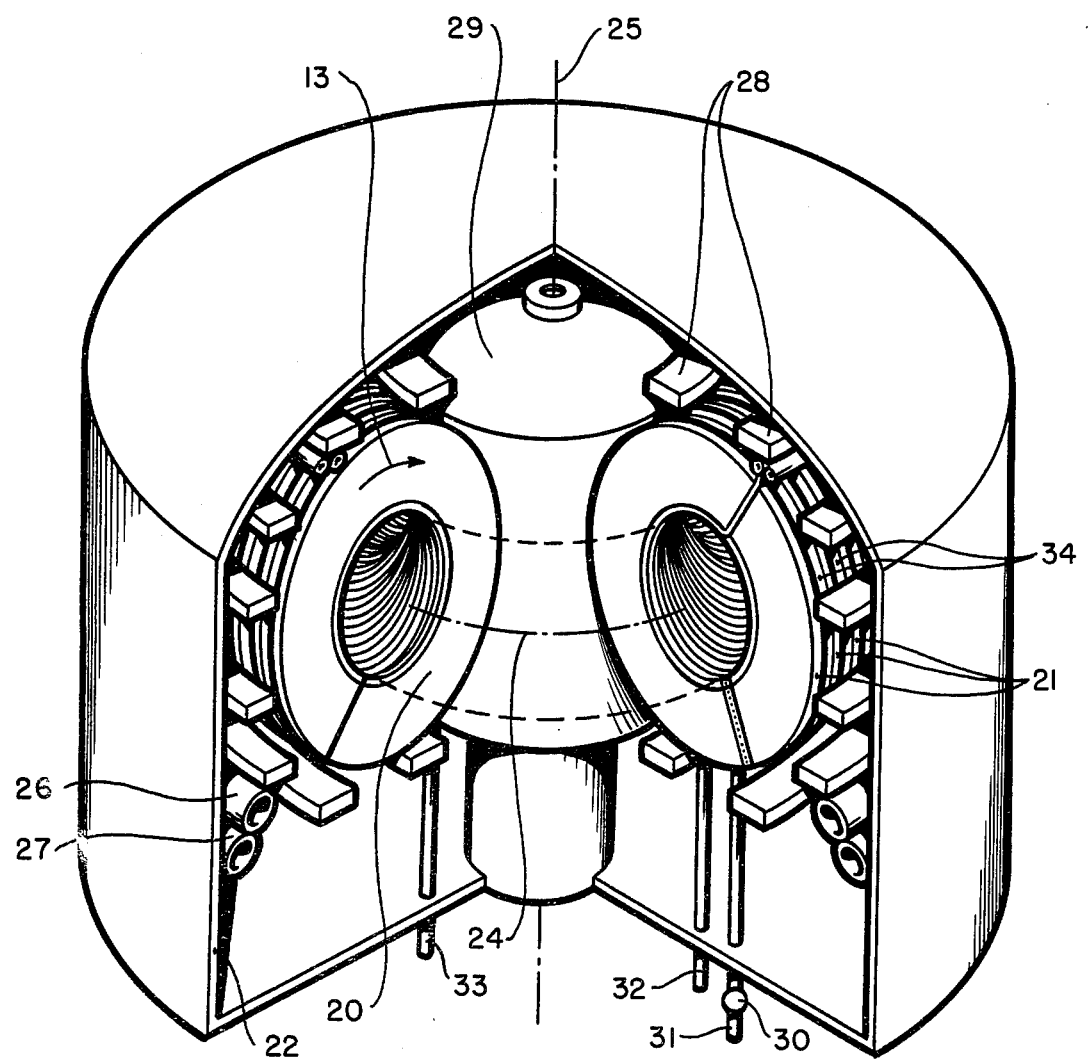
FIG. 2 is a perspective cutaway view of the core of XBTFR of FIG. 1.

Turning now to FIG. 2, there is depicted a detailed view of the TFR core of FIG. 1. The TF coil winding 21 have spaces 34 between their outer portions (i.e., that portion furthest away from the vertical axis 25). It is mainly through the spaces 34 that the neutrons and heat generated in plasma 20 radiates. It will also be appreciated by the artisan that the coils 21 can, in accordance with the teachings in co-pending commonly assigned application Ser. No. 340,237 utilize Al or Al alloy or other material of high electrical conductivity and low neutron absorbtion in the outer portions of the windings 21. The TF coils 21 are cooled with coolant passing through coolant inlet and outlet manifolds 26 and 27, respectively. Current (as indicated by arrow 13) flows through the coils 21 in a closed spiral fashion, much like a "slinky" that is closed upon itself forming an endless toroidal spiral. The TF coil winding assembly encloses the plasma region 20 about a toroidal axis 24 and is centered about a vertical or main axis 25. The TFR core contains ohmic heating (OH) coils 29 as well as other poloidal coils, e.g. 28. Fuel is fed into the plasma region 20 through fuel feed line 31 and valve 30 which form no part of the instant invention except that like the purge means 32 and the diagnostic equipment 33, it occupies space in the vicinity of the TF coils 21 and it requires access to the plasma region 20 in the vicinity where even very small amounts of space are at a premium in a compact TFR. It will be appreciated that any TF coil design which affords space in the vicinity of or access to the plasma region 20 is very important in this regard.

Positioned between the TFR core and the blanket region is a vacuum vessel 22. It will be understood by one of skill in the art that the vacuum vessel can be placed in other convenient locations as well and also that more than one vacuum vessel can be utilized.

Figure 3:
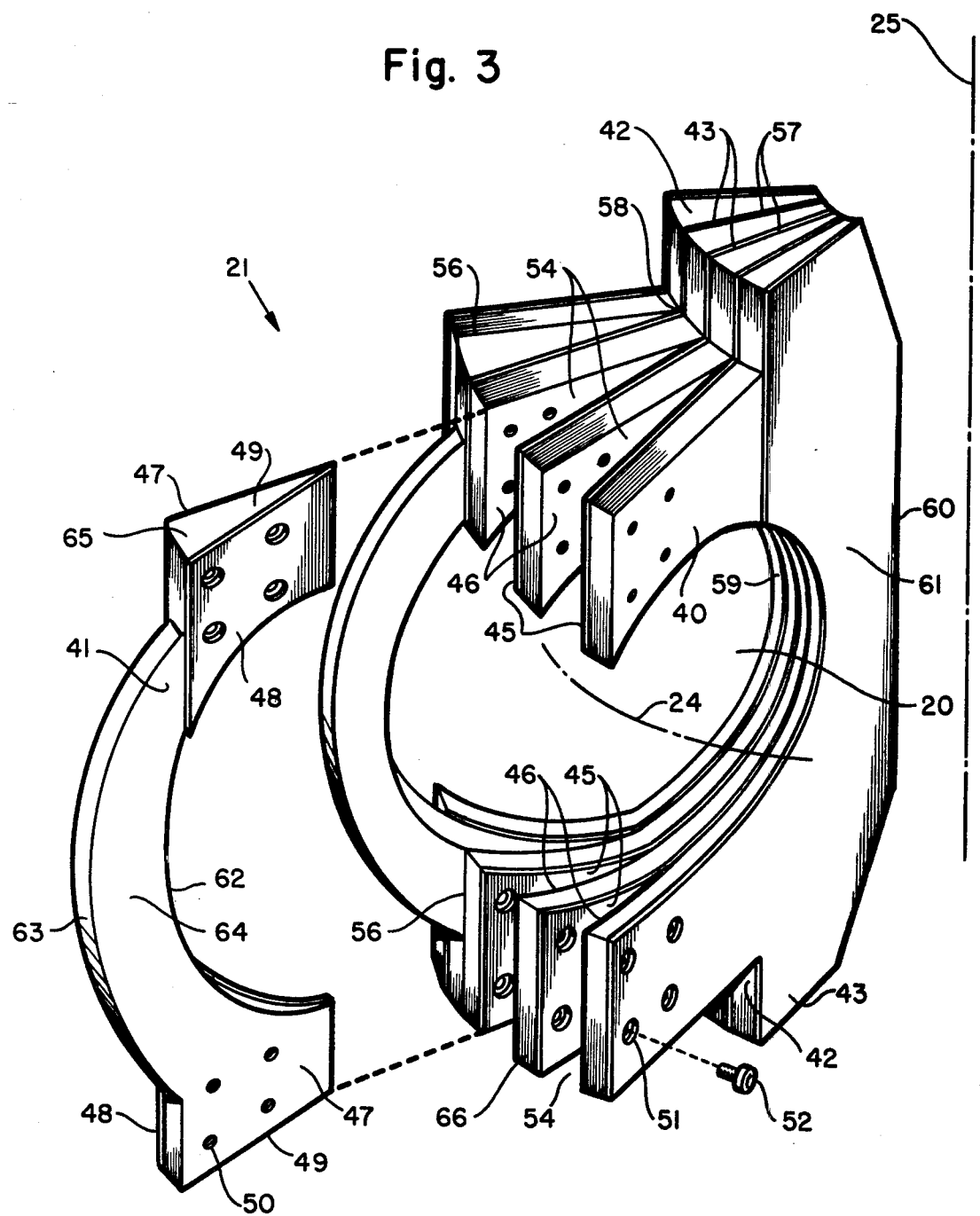
FIG. 3 is a fragmentary, perspective view, partially exploded of a TF coil winding assembly in accordance with the invention.

Turning now to FIG. 3 there is depicted the preferred embodiment of Applicant's TF coil 21 in accordance with the invention. Each spiralling coil or electromagnet is generally enclosing a circular cross-section plasma region 20, although it should be understood that any other plasma cross-section could be utilized. The coil winding is divided into two segments, an inner segment 40 and an outer segment 41. It should be appreciated that the coil winding can be segmented into more than two segments within the spirit of the present invention. At each end of each coil segment a current path is provided so the current can advance from winding to winding and thereby induce a toroidal magnetic field centered about toroidal axis 24. This magnetic field centers the high temperature plasma in the plasma region 20 and keeps it from touching any surface and thereby being cooled off or disrupted. The plasma may be originated and heated by means of fuel feed 30 and 31, and OH coils 29, (see FIG. 2) but which do not form a part of the present invention.

An important aspect of the present invention is its simplicity and the fact that its geometry maximizes heat flow from the plasma 20 to the blanket 15 by elimination of any bulky crossover connections from coil to coil that could restrict the heat and/or neutron flow. Exclusive of fastening means, each TF coil winding of the preferred embodiment of the present invention only contains two components, an inner coil segment 40 and outer coil segment 41 and requires no expensive machining such as precision twisting.

Each inner segment 40 consists of a tapered, C-shaped segment which are arranged to form a ring-like assembly centered about vertical axis 25. The segments 40 are tapered towards the axis 25 and lean against each other at bearing surfaces 57 until they reach a break point 58 from which they radiate outward and form wedge-shaped spaces 54 between adjacent segments. The faces of the inner segments 40 are electrically insulated from each other by a layer of insulation 43.

Preferably, each segment 40 has upper and lower flange members 42 extending therefrom in bearing contact with the neighboring flange members. Each flange member is insulated from the adjacent flange members by the insulation layer 43. These members, when assembled, cooperate to counteract the torsional overturning forces on the coil windings after they have been energized.

The inner segments 40 have inner counters 60 and outer counters 59 with respect to the vertical axis 25. Between these edges is the radial face or build 61 of the segment 40.

Outer portions 41 consist of a generally "humpback" segment with inner edge 62, outer edge 63 and a radial face or build 64. The segment has upper and lower end portions 49, each with an electrically conductive face 47 and an electrically insulated face 48. The insulated and conductive sides are reversed on the upper and lower side. By this arrangement there is no "right" or "wrong" way to orient the outer segments 41 or the inner segments 40. All inner segments are interchangeable with each other as are the outer segments. In addition, each of the inner and outer segments are reversible with respect to its top and bottom.

The ring of inner segments 40 form wedge-shaped openings 54 at the top and bottom extremities of the inner segments 40. The wedge-shaped opening 54 have an insulated face 45 and an electrically conductive face 46.

The end portions 49 of the outer segments 41 are also wedge-shaped and contoured to fit into the wedge-shaped openings 54. The segments are electrically connected at joints 56 preferably by conventional metallurgical metal joining methods such as welding, brazing or bonding. The contacting surface at the joint can be flat, serrated or stepped as described in co-pending, commonly assigned application Ser. No. 340,206. Alternatively, the joint may be mechanical in nature, by bolted or equivalent means, and may contain a metallic powder in a base paste or other form to compensate for any misalignment.

The insulation 43 can coat all bearing surfaces or the entire exterior surface of the segments, except, of course, for the electrical connecting surfaces between coil segments and between coil turns.

Preferably, all of the coil segments are tapered towards the vertical axis. As will be understood by the artisan, the angle of the tapering is a function of the number of coil turns which go into forming the entire coil winding assembly; the larger the number of turns, the smaller the tapering angle. The outermost thickness of the coil segments may be the same or may be varied to accommodate other reactor equipment.

Preferably, the non-conducting sides 48, of the end portions 49 of the outer segments 41 are connected to the non-conducting sides of the wedge-shaped spaces 54 between inner segments 40. Mechanical fastening means may preferably be used to secure the inner and outer segments. It should be understood that metalurgical connections or other fastening methods can also be utilized.

Figure 3A:
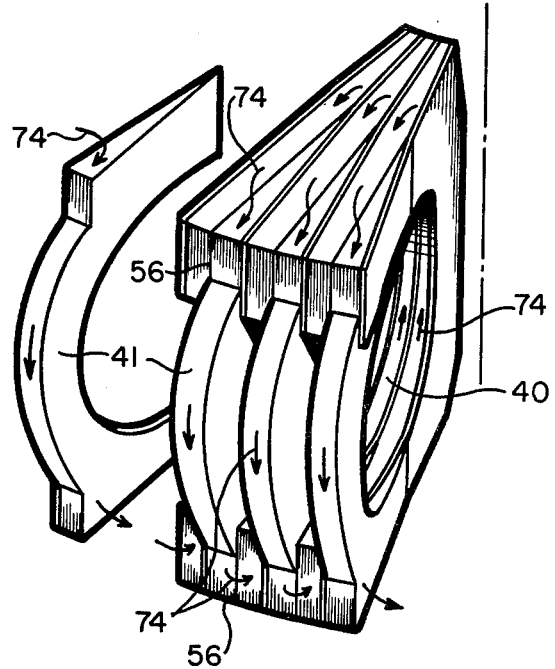
FIG. 3A is a partially exploded front view of FIG. 3 indicating current flows in the TF coils.
Figure 3B:
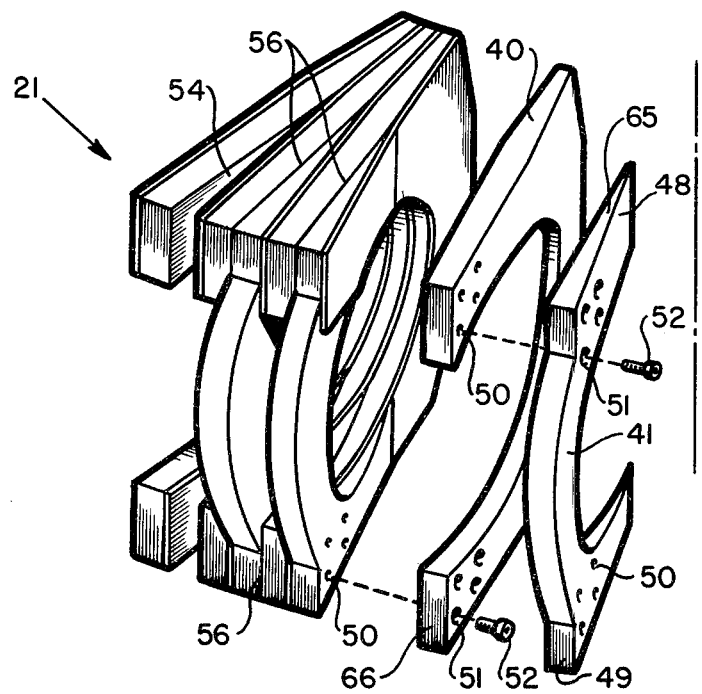
FIG. 3B is a partially exploded, front view of FIG. 3 indicating segment connections.

Turning now to FIG. 3B, there is depicted the mechanical joint between the non-conducting sides of the wedge-shaped space 54 and the non-conducting sides 48 of the end portion 49 of the outer segment 41. The insulation surfaces may be flat, may be stepped, or may be serrated, or have such other surface configuration as to ensure positive mating between the contact surfaces. A countersunk hole 51 is drilled into the non-conducting side of the surfaces forming the joint pair, and a hole 50 is drilled into the conducting side of the pair of mating surfaces forming the joint 56. Bolt 52 is used to form the connection, the bolthead sitting in the countersunk hole and threaded into a threaded hole liner or into a nut, and securely fastened. It should be understood that the joint may alternatively be formed metallurgically by welding or brazing between the conductive surfaces. In that instance, the use of bolt fastening is optional and depends upon the strength required for the joint.

It should be understood that the triangle-like flange portions 65 of the end portions 49 extending outwardly from the generally C-shaped contour bears against a similarly shaped portion of the end of the inner segment 40. These triangular bearing surfaces (through which the fastening means 52 may be positioned) constitute additional bearing surfaces to counteract the effect of torsional overturning forces on the coil winding assembly 21.

As depicted in FIG. 3, a total of four bolt members 52 are utilized to join the outer segments 41 and inner segments 40 of each coil winding. It should be apparent to the artisan that greater or lesser numbers of bolts 52 may be used to perform this function or as explained above, the joint may be a metallurgical one not requiring bolt members 52.

Turning now to FIG. 3A, there is depicted a front view of a coil assembly in accordance with the embodiment of FIG. 3. In this view, the current flows are depicted by arrows 74. Moving through the TF coil assembly from left to right, it can be seen that the current flows through the inner coil winding segment on the extreme left side of FIG. 3A through joint 56 and through outer TF coil segment 41 and then through bottom contact surface 56 and up through the neighboring inner TF coil segment 40. This sequence is repeated until the current flows completely around and through each inner and outer TF coil segment thereby advancing through the entire toroidal field winding from beginning to end.

Figure 4A:
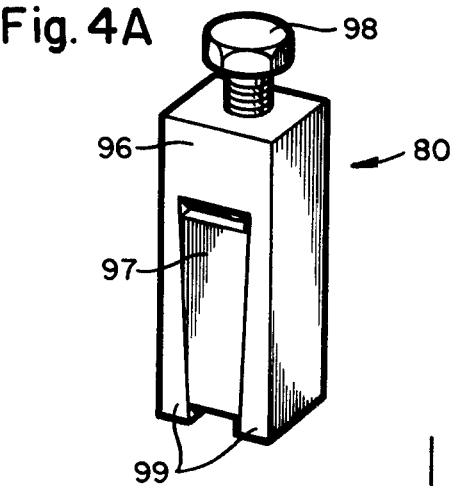
FIG. 4A is a perspective view of an example of a key member for the embodiment of FIG. 4.
Figure 4:
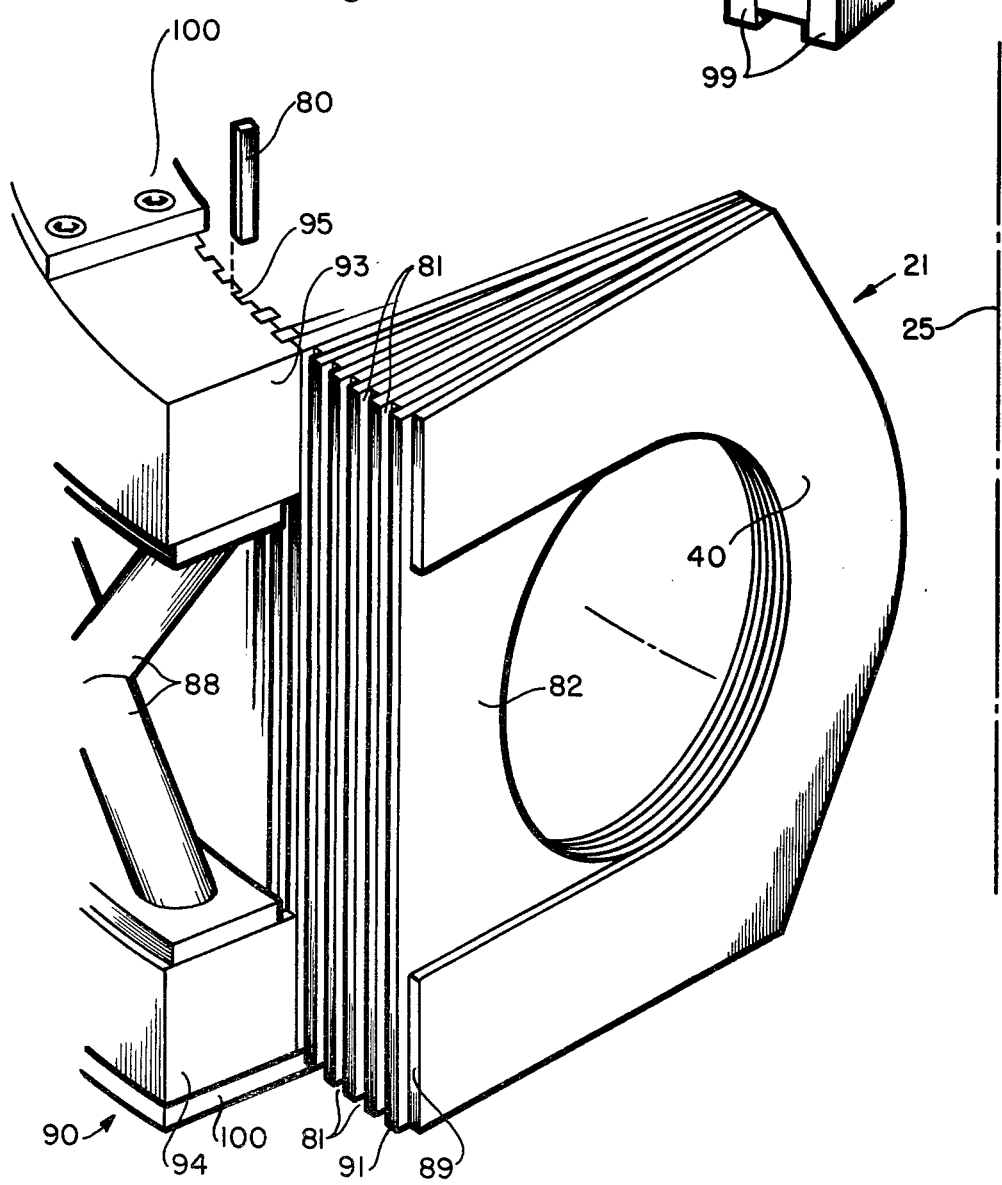
FIG. 4 is a partial, perspective view of an alternate embodiment of the present invention.

Turning now to the embodiment of FIG. 4, there is depicted an alternate arrangement for the segmented toroidal field coil winding assembly wherein inner segments 40 are formed without flange members 42. In this embodiment, the torsional overturning forces imposed on the energized TF coil winding assembly are counteracted by external support rings indicated by 90. The external support rings abut against the assembly of outer toroidal field coil segments 82 and inner toroidal field coil segments 40. Inner toroidal field coil segments 40 are constructed so that the edge 89 of segments 40 do not extend to the edge 91 of outer segments 82. Thus, when the segments are joined together, a groove 81 is formed in between the outer segments 82. The external support ring generally indicated at 90 may have an upper ring 93 and a lower ring 94 encircling and enclosing the TF field coil assembly 21. The upper ring 93 and the lower ring 94 may alternatively be fashioned to present a smooth conforming shape to the TF coil assembly 21 or may be formed with grooves 95 to complement the grooves 81 formed by the inner and outer TF coil segments 40 and 82, respectively. A key member 80 is inserted into the groove formed between the external support ring and the groove 81 to positively engage the TF coil segments together and to act as shear bearing members to support the TF coil windings against overturning forces.

It will be appreciated that in the embodiment of FIG. 4, allowance can be made for expansion of coil segments in the direction radially away from the central axis 25 and in the direction along the central axis 25.

Where both an upper ring 93 and a lower ring 94 are used to support the toroidal field coil assemblies, the rings may preferably be braced by structural cross-members 88. If required, electrical breaks and insulation may be used to prevent induction of eddy currents in or between any structural members or toroidal field coils. This insulation forms no part of the present invention and may be conventional in design.

In addition, ring members 100 may be attached to upper ring 93 and lower ring 94, respectively. These ring members serve to preserve the inner leg of the composite coil in its proper configuration. If, due to magnetically induced stresses or for any other reason the legs of the inner C-shaped coil segment 40 tend to straighten to an "I" the rings 100 will act to restrain the movement and preserve the proper coil geometry.

Turning now to FIG. 4A, there is depicted an exemplary key member 80 that may be used in the embodiment of FIG. 4. The key member consists of a body 96 having an inversely tapered cutout portion forming legs 99. Positioned within the inversely tapered cutout portion is a correspondingly tapered block 97. A bolt 98 passes through the body 96 and abuts the block 97. By rotating the bolt 98 in such a manner as to move the block 97 downward, the legs 99 of body 96 are forced to spread further apart. It will be appreciated that the keys 80 can be inserted into the key openings 81 with the legs in their unspread position. In this way, the insertion is easy as the key member will fit loosely into the space provided. By turning the bolt 98 in a manner to force the legs 99 apart, a tight fit of the key in the key hole will be assured. It should be understood that this key member is only exemplary of the type of anchoring devices that can be employed in accordance with the embodiment of FIG. 4.

The foregoing description of a preferred embodiment of the invention has been presented for purposes of illustration and description. It is not intended to be exhaustive or to limit the invention to the precise form disclosed, and obviously many modifications and variations are possible in light of the above teachings. It is intended that the scope of the invention be defined by the claims appended hereto.

What is claimed is:

1. A segmented magnetic coil winding assembly substantially defining a toroidal region having a vertical axis and a toroidal axis, said assembly comprising a plurality of electrically connected coil windings, each of said coil windings comprising:

an inner segment on a side nearest the vertical axis and an outer segment on the side furthest from the vertical axis;

said inner segments comprising:
a plurality of C-shaped members having a first contour substantially following said toroidal region and a second contour, radially spaced with respect to toroidal axis from the first contour, said first and second contours defining therebetween an inner build region wherein each inner segment bears against and is electrically insulated from adjacent inner segments along at least a part of said inner build region;

said outer segments comprising:
a plurality of members having an inner contour substantially following said toroidal region and an outer contour, said inner and outer contours defining an outer build region, each outer segment terminating at a wedge-shaped segment connecting means having an electrically conducting face and being spaced from adjacent outer segments in the direction of said toroidal axis;

a wedge-shaped segment receiving means formed between adjacent C-shaped members, said receiving means having an electrically conducting surface opposing the electrically conducting surface of said wedge-shaped segment connecting means for forming an electrical connection therewith, said wedge-shaped segment connecting means having a complementary contour to said wedge-shaped segment receiving means wherein said electrically conducting surfaces of said wedge-shaped receiving means and said wedge-shaped connecting member positively engage to form said electrical connection; and means for physically joining adjacent coil windings.

2. The segmented magnetic coil assembly of claim 1, wherein said C-shaped members have at least one upstanding flange means for relieving overturning moments imposed on the coil winding.

3. The segmented magnetic coil assembly of claim 1, wherein said outer segments comprise a generally humpback-shaped member.

4. The segmented magnetic coil assembly of claim 1, wherein said outer segments comprise a generally squareback, I-shaped member.

5. The segmented magnetic coil winding assembly of claim 1, wherein said segment connecting means is fastened by a fastening means to said inner segments.

6. The segmented magnetic coil winding assembly of claim 5, wherein said fastening means comprises complementary serrated surfaces on said wedge-shaped member and on a face of said wedge-shaped space.

7. The segmented magnetic coil winding assembly of claim 5, wherein said fastening means further comprises bolt means connecting said inner segments and said outer segments at said fastening means.

8. The segmented magnetic coil winding assembly of claim 5, wherein said inner, generally C-shaped segments and said outer generally I-shaped segments define a groove portion and an external support ring abutting said segmented magnetic coil winding assembly to relieve overturning moments imposed on said coil windings, wherein said ring at least partially encloses said groove portions and further comprising an expansion key means, carried in said groove portion.

9. A method of making a segmented toroidal field coil winding assembly comprising:

(a) forming an inner ring, about a vertical axis of a toroidal region and along an inner build, of a plurality of generally C-shaped coil segments, (b) tapering, in the general direction of the vertical axis, said generally C-shaped coil segments wherein said inner coil segments bear against each other through a layer of insulation at a region nearest said vertical axis, (c) forming upper and lower wedge-shaped spaces between said coil segments at a region remote from said vertical axis, each of said upper and lower wedge-shaped spaces an electrically conductive surface, (d) inserting an outer coil segment having wedge-shaped end portions with an electrically conductive surface between each of the upper and lower wedge-shaped spaces with said electrically conductive surfaces of said wedge-shaped spaces and said wedge-shaped end portions in intimate contact to form a series of conducting coil windings, and (e) fastening said inner and outer segments together.

10. The method of claim 9, wherein the step of fastening includes fastening mechanically.

11. The method of claim 9, wherein the step of fastening includes fastening metallurgically.

12. The method of claim 9 wherein the step of forming upper and lower wedge-shaped spaces further comprise the step of forming each wedge-shaped space to have an electrically insulated surface.

13. The method of claim 9 wherein the step of inserting further comprises using wedge-shaped end portions having an electrically insulated surface.

14. The method of claim 9 further including the step of supporting the toroidal field coil winding assembly against overturning moments.

15. The method of claim 14, wherein the step of supporting includes forming internal support means.

16. The method of claim 14, wherein the step of supporting includes forming external support means.

* * * * *